July 28, 1953  W. M. PARRY  2,646,870
ARTICLE HANDLING MACHINE
Filed March 10, 1948  7 Sheets-Sheet 1

INVENTOR.
Wallace M. Parry
BY
Moore, Olson & Trexler
attys

July 28, 1953 W. M. PARRY 2,646,870
ARTICLE HANDLING MACHINE
Filed March 10, 1948 7 Sheets-Sheet 7

INVENTOR.
Wallace M. Parry
BY
Moore, Olson & Trexler
Attys.

Patented July 28, 1953

2,646,870

UNITED STATES PATENT OFFICE 2,646,870

ARTICLE HANDLING MACHINE

Wallace M. Parry, Rockford, Ill., assignor to Odin Corporation, Chicago, Ill., a corporation of Illinois Application March 10, 1948, Serial No. 14,073

14 Claims. (Cl. 198—30)

This invention relates to article handling apparatus, and concerns particularly machines for rearranging or refiling containers such as glass jars or cans, in connection with the processing or packaging thereof.

In the processing of various types of articles, it frequently is necessary to effect the rearrangement thereof so as to facilitate or complete the various processing operations. For example, in the processing and packaging of food containers, it may become necessary to rearrange a disordered mass of the containers into a single or multiple file sequence, so as to enable the containers to be further processed or packaged with facility and dispatch.

In instances wherein such arrangement handling is effected at high speed, or high capacity, difficulty is encountered in the jamming or breaking of the articles being handled, particularly where they are of frangible nature such as glass jars. The satisfactory and high speed handling of glass jars is further complicated by reason of the fact that the jars may at times be either filled or empty, and may also be either dry or wet as they are transmitted between various processing mechanisms.

It is an object of the present invention to provide an article handling apparatus, for installations of the type above set forth, of improved construction and improved operating characteristics.

More specifically stated, it is an object of the present invention to provide a high speed handling or rearranging apparatus, particularly for use with frangible containers such as glass jars, wherein the containers will be rearranged with facility and dispatch, and with a minimum of jamming, breaking, or tipping of the containers being transmitted through the machine.

A further object of the invention is to provide an improved article handling or rearranging machine, of the type defined wherein the output pattern of the machine may be, within limits, adjusted as required; wherein the containers may be handled at high speed either filled or empty, or dry or wet; and wherein the machine parts may be more readily fabricated and assembled, and will be more durable in operation, in respect to the capacity of the machine.

A still further object of the invention is to provide an improved article handling machine, particularly for containers and the like, which may be readily adapted for use with either metal cans or glass jars, as occasion may require.

Various other objects, advantages and features of the invention will be apparent from the following specification, when taken in connection with the accompanying drawings, wherein certain preferred embodiments are set forth for purposes of illustration.

In the drawings, wherein like reference numerals refer to like parts throughout.

Referring more particularly to the drawings, and first to the embodiment of Figs. 1–13, there is illustrated a machine particularly adapted to the high speed handling and rearranging of glass jars, such for example as food containers, to which the invention has particular applicability.

Figure 1:
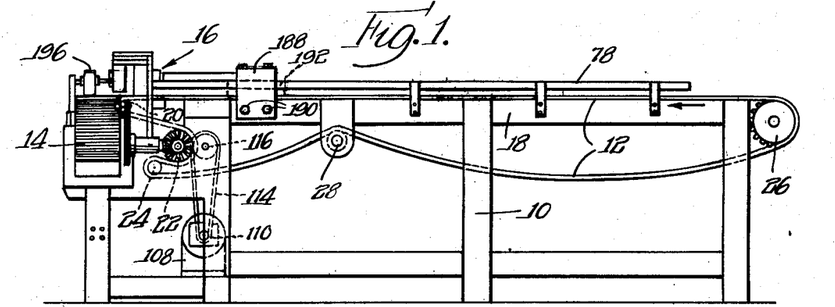
Fig. 1 is a side elevation of an article handling or rearranging machine, particularly adapted for the handling of glass jar containers, and constructed in accordance with and embodying the principles of the present invention.
Figure 2:
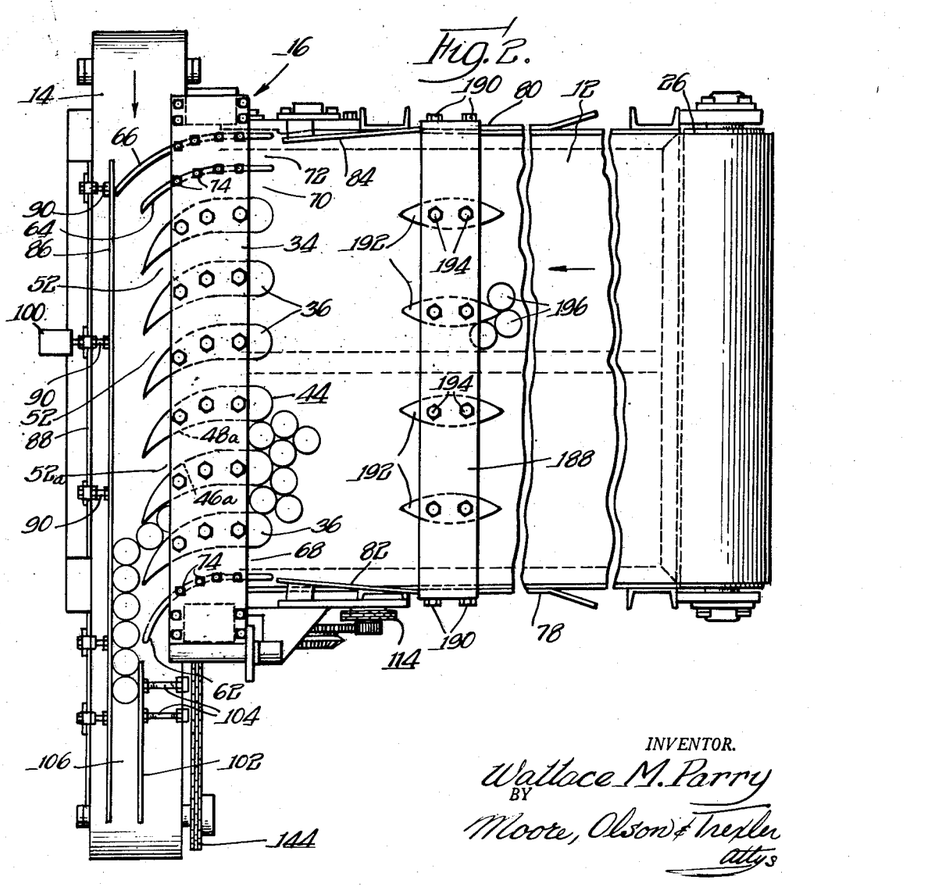
Fig. 2 is an enlarged top view of the machine with parts of the main frame structure broken away, illustrating the relationships between the infeed and outfeed conveyors, and their associated parts.
Figures 3, 4, 5, 6:
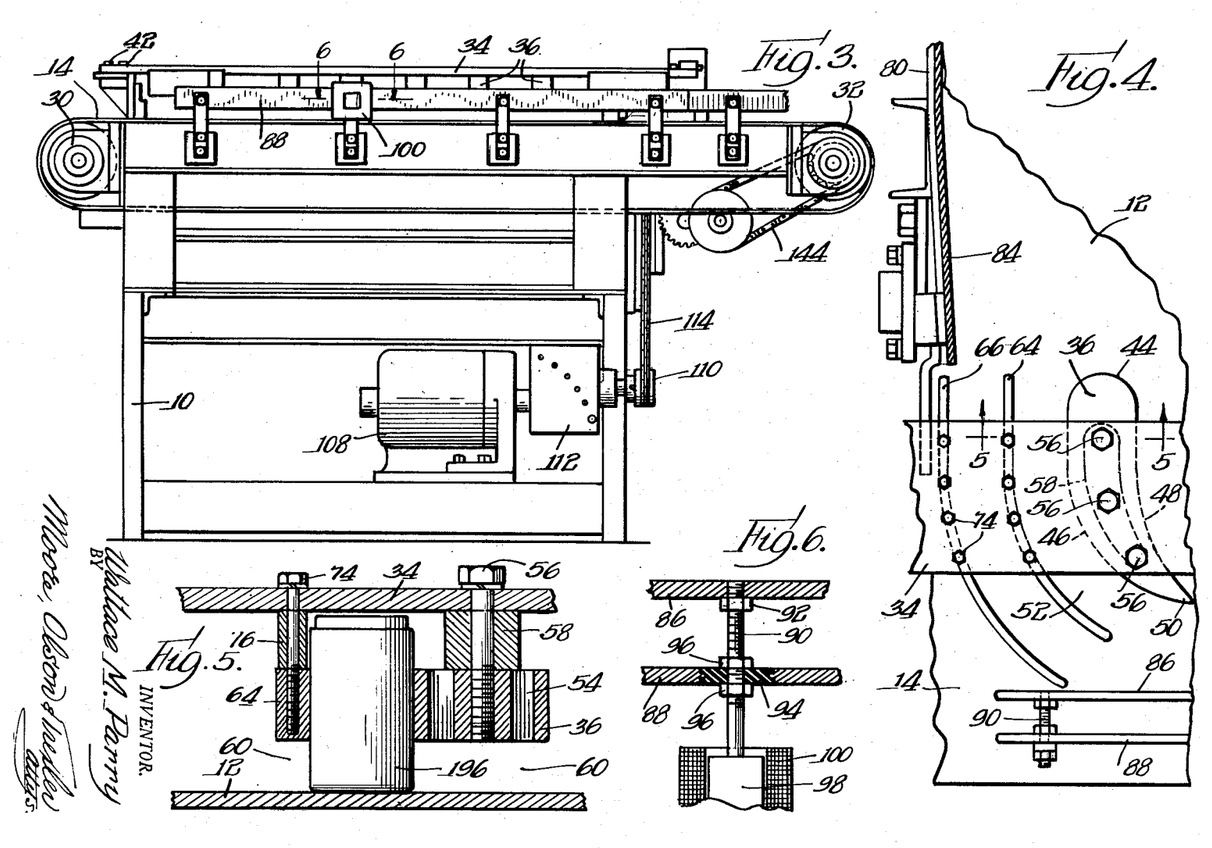
Fig. 3 is a front view of the machine, on the scale of Fig. 2.
Fig. 4 is an enlarged detail view of the reciprocating finger bar, and associated parts, forming the transfer mechanism for transferring the articles between the infeed and discharge conveyors.
Fig. 5 is an enlarged detail view of a part of the mechanism of Fig. 4, taken as indicated by the line 5—5 thereof.
Fig. 6 is an enlarged detail view of a vibrator device, forming a part of the transfer means.

Referring to Figs. 1, 2 and 3, it will be seen that the machine comprises a frame structure 10 upon which is carried an infeed conveyor 12, an outfeed or discharge conveyor 14, and a transfer and rearranging mechanism, generally indicated by the numeral 16, for transferring the jars between the conveyors, and for effecting the rearrangement thereof in accordance with the desired machine output pattern. In the particular embodiment illustrated the jars are placed upon the infeed conveyor in disordered array, and are delivered from the discharge conveyor 14 in single file sequence, for transmission to processing, packaging, or labeling apparatus, as the case may be.

More specifically, the infeed conveyor comprises an endless metal belt, of suitable flexible construction, driven in the direction of the arrow in Figs. 1 and 2, and having a width substantially commensurate with that of the main frame structure. The upper reach of the belt lies upon and is propelled along the frame table 18, the lower reach of the belt returning thereunder. The belt is supported at its forward end by a series of rolls 20, 22 and 24, Figs. 1 and 7, the rolls 22 and 24 being driven by means presently to be described. The belt is supported at its rear end by an idle roll 26, the lower belt reach also being supported, in part, by an intermediate idle roll as indicated at 28.

The outfeed or discharge conveyor belt 14 is relatively more narrow than the belt 12, and is driven at a higher rate of speed in the direction of the arrow, Fig. 2, in the operation of the machine. The belt 14 may be of suitable metal flexible link construction. As best shown in Fig. 3, it is supported at its opposite ends upon a pair of rolls 30 and 32, the latter being propelled by drive mechanism later to be described.

Figures 8, 9:
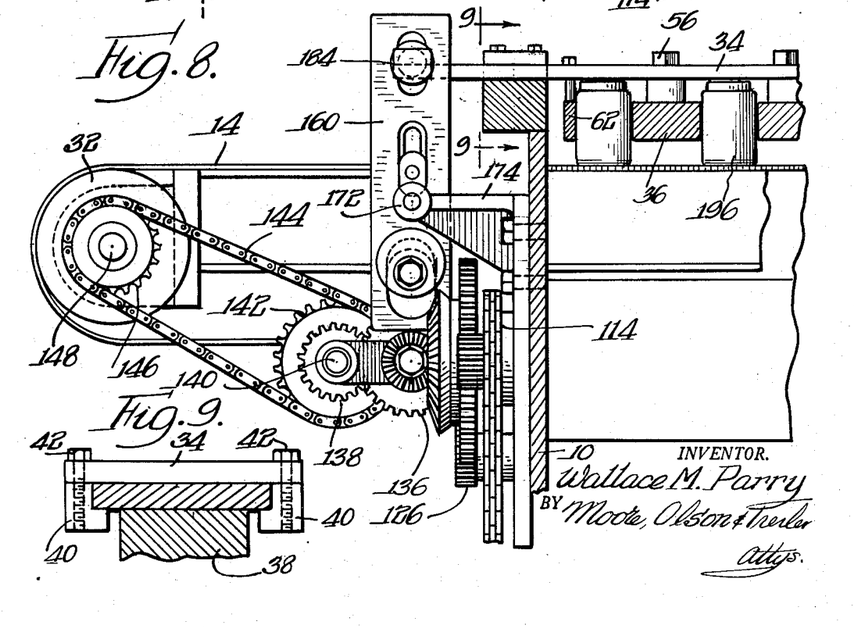
Fig. 8 is a sectional view of the structures of Fig. 7, taken as indicated by the line 8—8 thereof.
Fig. 9 is a section detail of the structure indicated by the line 9—9 of Fig. 8.

The transfer mechanism 16 comprises a reciprocating bar 34, Figs. 2 and 3, upon which is supported a plurality of guide fingers or transfer members 36. The bar 34 is slidably mounted at its opposite ends upon the frame structure 10, by means as illustrated in Figs. 8 and 9. More particularly, the frame structure carries at its upper portion, adjacent each end of the bar 34, a support plate or bracket 38 which is T-shaped in cross section. The bar 34 is provided at its opposite sides with slide brackets 40, held in position by bolts 42, a support means thus being provided to permit the free reciprocation of the bar transversely of the conveyor 12, or in a direction longitudinally in respect to the conveyor 14. The means for reciprocating the bar, in timed relation with the operation of the conveyors, will be later described.

The detailed shaping of the transfer fingers 36, and their manner of mounting, is best shown in Figs. 2, 4, 5 and 13. It will be seen that each of the fingers is provided with an arcuate surface 44 which is initially engaged by the jars as they are conveyed along the conveyor 12. Each finger is further provided with a pair of arcuate surfaces as indicated at 46 and 48 terminating in a blunt point 50. The arc of curvature of each finger surface 48 is greater than the arc of curvature of the surface 46, and is so proportioned in respect thereto as to define a channel 52 of constant width between each pair of fingers to receive and guide the jars. More specifically, the outside curvature 46 of each finger is swung from the same center as the inside curvature of the next adjacent finger, for example as indicated at 46a and 48a in Fig. 2, whereby to define a passage 52a between the fingers of uniform width along its entire length. The transfer fingers may be formed of various suitable materials, such as fiber or the like, but in the particular embodiment shown they are in the form of bronze castings suitably cored as indicated at 54, Fig. 13, to minimize weight.

Each transfer finger is supported from the bar 34 by bolts 56, and is maintained in spaced relation to the bar by a spacer member 58. The provision of the spacer members minimizes the surface of contact between the transfer fingers and the jars, while at the same time locating the fingers, vertically, so that the jars are engaged along their central and lower portions to minimize tipping. The transfer fingers are supported so that they well clear the surfaces of the transfer belts, as indicated at 60, Fig. 5.

At the opposite ends of the bar 34 there are provided fingers as indicated at 62, 64 and 66, Fig. 2, which may preferably comprise relatively thin bars of uniform thickness and shaped so as to define jar passageways of uniform width as indicated, respectively, at 68, 70 and 72; the cooperating juxtaposed curved surfaces forming the passageways in each instance being swung from a common radius in the same manner as previously described in reference to the finger members 36. The fingers 62, 64 and 66 are supported from the bar 34 by bolts 74 and spacers 76, Fig. 5, in a manner similar to the mounting of the transfer fingers 36.

The opposite frame side walls 78 and 80 extending along the table 18 on the opposite sides of the belt 12, and serving as means for retaining the jars on the belt, are provided at their forward ends with guide members as indicated at 82 and 84, Fig. 2, for guiding the jars, respectively, into the transfer passages 68 and 72.

The positioning of the transfer finger or bar 66 is such that it approaches but does not contact the side wall structure 80 as the reciprocating bar 34 reaches the limit of its travel leftwardly as viewed in Fig. 3. It will further be noted that the finger 66 is somewhat longer than the other transfer fingers, and that it extends to a position adjacent an abutment and guide bar 86, the mounting and function of which will now be described.

The guide bar 86 is supported from a fixed bar 88, forming a part of the main frame of the machine, by means of a series of bolts 90, the detailed arrangement thereof being shown in Fig. 6. Each bolt has threaded connection at its end with the guide bar 86, and is interlocked therewith by suitable means such as lock nut 92. A rubber washer or grommet 94 is secured into the fixed frame bar 88, in association with each bolt, the bolt being secured thereto by means of a pair of lock nuts 96. It will be seen that each rubber grommet 94 thus forms a flexible support structure for its associated bolt 90; and furthermore, by adjustment of the lock nuts 96, each bolt may be longitudinally shifted or adjusted in respect to the fixed frame member 88 so as to adjustably position the guide bar 86 in accordance with the size of the jars, and in accordance with the output pattern desired as the jars are delivered from the conveyor 14.

As also indicated in Figs. 2 and 6, one of the bolts 90 is extended and is provided on its end with an armature 98 cooperating with a coil 100 adapted for connection to a suitable source of alternating current power supply. It will be seen that the coil and armature thus form an A. C. vibrator for transmitting a rapid vibratory movement to the guide bar 86. Preferably the several support grommets 94 for the support bolts 90 are sufficiently rigid so that only a slight physical displacement is imparted to the guide bar due to the vibratory action.

An auxiliary guide plate 102, Fig. 2, is positioned adjacent the discharge end of the conveyor 14, in juxtaposition to the guide bar or plate 86, the plate 102 being adjustably supported on the main frame of the machine by bolts 104. The guide bars or plates 86 and 102 define a passageway 106 adjacent the discharge end of the conveyor 14, from which the jars are emitted in the operation of the machine.

The drive means for the conveyor belts 12 and 14, and for effecting the controlled reciprocation of the transfer finger support bar 34, is best illustrated in Figs. 7, 8 and 10–12. A drive motor 108, Figs. 1 and 3, is suitably supported upon the main frame of the machine, the motor being arranged to effect the operation of a drive pulley 110 through the intermediary of a change speed gearing or speed variator 112 which may be of any suitable approved construction. Pulley 110 is arranged to drive a flexible chain 114, the upper end of which engages and drives a sprocket 116, Fig. 7, fixed to a shaft 118, suitably journalled in the machine frame structure. This shaft carries a pinion 120 arranged to mesh with and drive a gear 122 fixed to a shaft 124 which carries the belt roll 22 previously described. Gear 122 also meshes with and is arranged to drive a gear 126 carried by a shaft 128 to which the belt roll 24 is secured. It will be seen that by reason of the connections provided, as the motor 108 is operated, gears 122 and 126 will be actuated at predetermined speed, in accordance with the setting of the speed variator 112 to effect the actuation of the belt rolls 22 and 24 so as to propel the infeed conveyor belt 12 as previously described.

Figure 7:
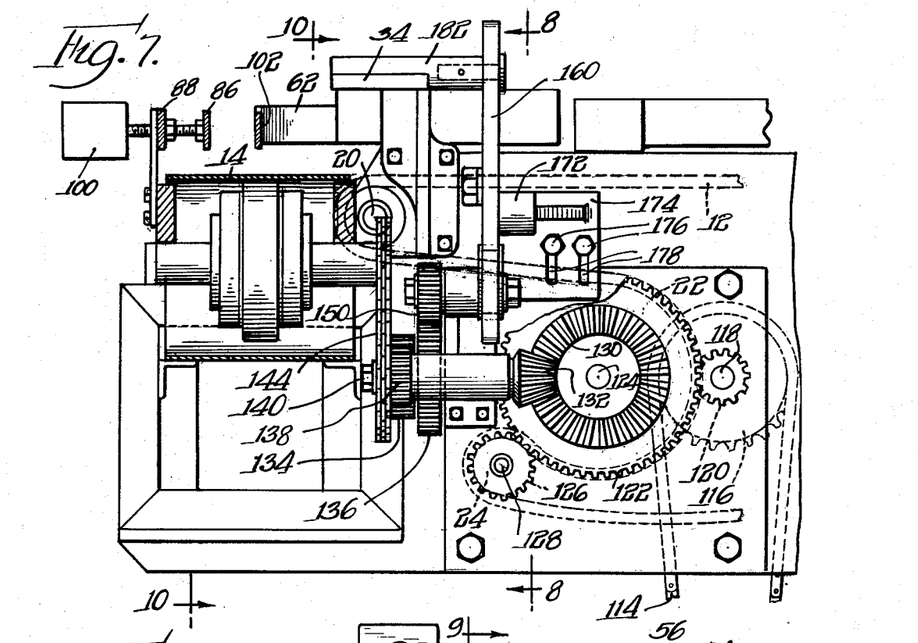
Fig. 7 is an enlarged partial view of the front portion of the machine, similar to Fig. 1, and more particularly illustrating the drive means for the various machine parts.

Shaft 124 also carries a bevel gear 130, Fig. 7, arranged to mesh with a bevel pinion 132 secured to a stub shaft carrying a pair of gears as indicated at 134 and 136. Gear 134 meshes with and drives a pinion 138 fixed to a stub shaft 140 which carries a sprocket 142 arranged to actuate a flexible drive chain 144. As best shown in Fig. 8, this chain extends to and is arranged to drive a sprocket 146 secured to a shaft 148 which carries the drive roll 32, previously described, for driving the chain conveyor 14. It will be seen that by reason of the connections described, the conveyor 14 is driven at all times during operation of the conveyor 12, in predetermined speed relation therewith. Furthermore, the gears 134 and 138 form a pair of removable pickoff gears, or speed variator mechanism, by which the speed of the conveyor 14 may be adjusted in respect to the rate of movement of the conveyor 12. Preferably, in the operation of the machine the conveyor 14 operates at a considerably greater speed than the conveyor 12, the latter being considerably wider and therefore having a greater jar capacity for a given rate of travel.

Figures 10, 11, 12, 13:
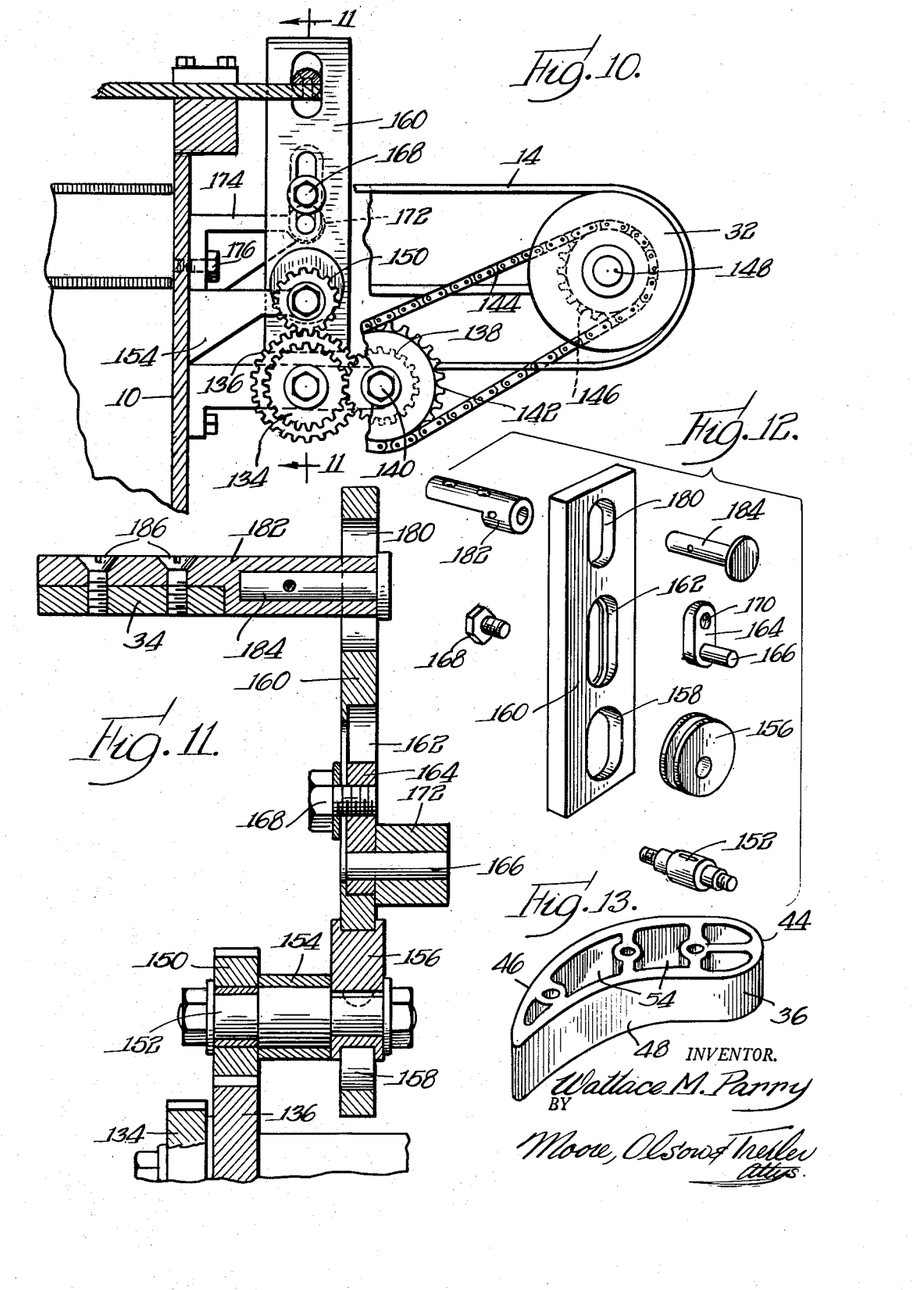
Fig. 10 is a further sectional view of the structures of Fig. 7, taken on the line 10—10 thereof.
Fig. 11 is a further enlarged sectional view of the drive mechanism for the reciprocating finger bar, taken as indicated by the line 11—11 of Fig. 10.
Fig. 12 is an exploded view of certain of the parts of Fig. 11.
Fig. 13 is a perspective view of one of the finger or transfer members.

The gear 136, previously mentioned, meshes with and is arranged to drive a gear 150, Figs. 10 and 11, fixed to a stub shaft 152, this stub shaft being suitably journalled in a hub bracket 154 forming a part of the fixed frame structure of the machine. At its opposite end the stub shaft 152 carries a drive member 156, Figs. 11 and 12, eccentrically carried thereon. This eccentric drive member operates within the lower slot 158 of a lever arm 160 arranged for pivotal mounting upon the frame of the machine. More particularly, the lever is provided adjacent its central portion with a shouldered recess and slot 162 arranged to receive a bracket 164, which bracket is provided with a projecting pivot pin 166. A clamp screw 168 is adapted to be received within a threaded opening 170 formed in the bracket 164, whereby the bracket may be adjustably secured to the lever arm 160 at any desired position along the length of the slot 162.

The pivot pin 166 is arranged to be pivotally supported within a hub 172 formed at the outer end of a bracket 174 fixed to the main frame of the machine by bolts 176. As best shown in Fig. 7, bracket 174 is provided with vertically disposed slots 178 therein within which the securing bolts 176 engage, whereby the bracket may be vertically adjusted in respect to the frame of the machine.

The lever arm 160 is further provided adjacent its upper end with a slot 180 arranged to slidably receive a bracket member 182 held against axial withdrawal from the slot by means of a headed bolt 184. Bracket 182 is secured to the finger support bar 34 by screws 186.

By reason of the connections described, it will be seen that operation of the gears 136—150 causes rotation of the eccentric 156 which in turn imparts oscillatory movement to the lever arm 160. Movement of the lever arm, through the bracket 182, effects the corresponding reciprocation of the finger support bar 34, whereby to reciprocate the bar and the transfer fingers carried thereby at predetermined speed and through a predetermined range of travel. The speed of movement of the bar 34 may be adjusted by substitution of the gears 136—150, these gears forming a pickoff set, or variator, for adjusting the operating speed of the driven parts. By adjusting the height of the support bracket 174 on the frame of the machine, coupled with the corresponding adjustment of the bracket 164 within the slot 162 of the lever arm 160, the pivot point of the lever arm may be changed whereby to adjust the throw or range of travel of the transfer finger support bar. Preferably, in the operation of the machine, the finger support bar 34 reciprocates relatively slowly, by way of illustration, in the neighborhood of sixty cycles a minute; but this may be varied to suit requirements as above set forth.

Referring further to Figs. 1 and 2, it will be seen that a bridge member 188 extends across the frame table 18, in spaced relation above the belt 12; the bridge being secured at its opposite ends to the table side walls by suitable means such as bolts 190. The bridge member carries a series of divider abutments 192, there being four such abutments shown in the particular embodiment illustrated. The abutments are suspended from the bridge member by suitable securing means, such as bolts 194, the abutments at their lower ends being properly spaced above the surface of the belt 12, as in the case of the transfer fingers previously described.

In the operation of the structure the glass jars, as indicated at 196 may be placed onto the belt 12 by hand, by automatic conveyor, or by any other suitable means. Movement of the infeed belt 12 causes the jars to shift to the left as seen in Figs. 1 and 2 into engagement with the approach ends of the several transfer fingers carried by the reciprocating bar 34 of the transfer mechanism. The jars, which assume a disordered array or mass upon the belt 12 when the machine is operating at or near capacity, slip upon the surface of the belt 12, but are urged thereby against the ends of the transfer fingers, so that as the fingers are reciprocated the jars gravitate through the several passageways 52, 68, 70 and 72 between the fingers, moving onto the discharge conveyor 14. As previously indicated, this conveyor preferably moves at a relatively high speed, the jars being delivered thereby from the machine in predetermined pattern, single file arrangement in the particular embodiment illustrated, between the guide plates 86 and 102. Preferably the upper surface of the discharge belt 14 is very slightly below the surface of the belt 12, so as to facilitate the movement of the jars.

The abutments 192 inhibit lateral motion of the jars upon the belt 12, thereby preventing the lateral swinging of the jar mass with the reciprocation of the transfer fingers, so as to facilitate the passage of the jars along the transfer finger passageways. The lateral motion of the transfer fingers, coupled further with the vibratory action of the vibrator 100, promotes the passage of the jars between the transfer fingers in an orderly fashion, at high capacity, but with a minimum of breakage or tipping of the jars being conveyed, and with a minimum of jamming. The structure is satisfactorily operable upon the jars, either in their filled or unfilled, or dry or wet condition. By adjustment of the guide bar 86, the output pattern of the jars, as they are delivered from the machine, may be varied as required. As will be understood, only a few jars are illustrated in the drawings, for clarity.

Figure 14:
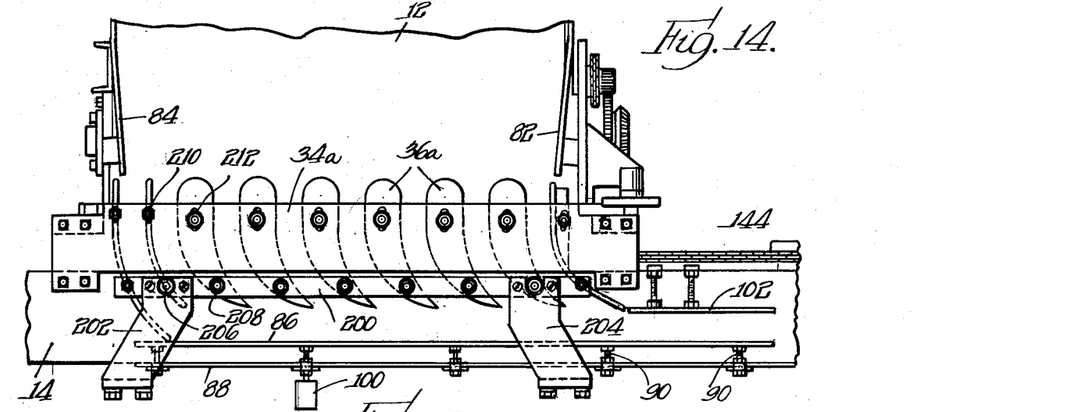
Fig. 14 is a view similar to Fig. 2, but illustrating a modified embodiment of transfer means.
Figure 15:
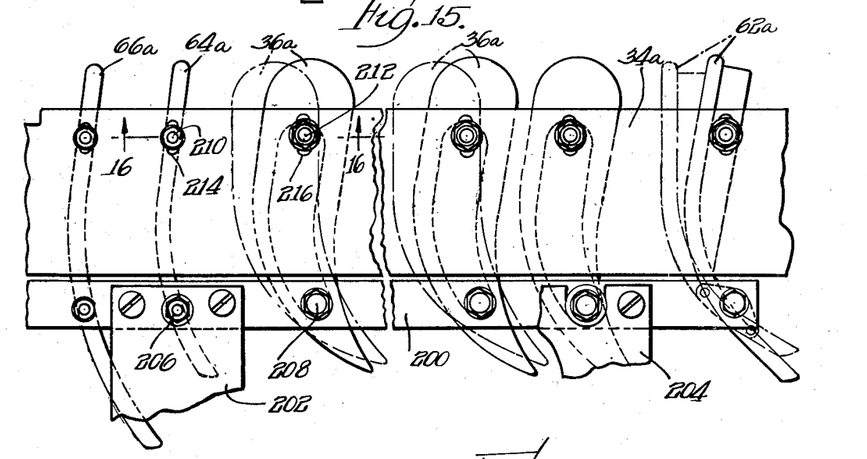
Fig. 15 is an enlarged detail view of the mechanism of Fig. 14.
Figure 16:
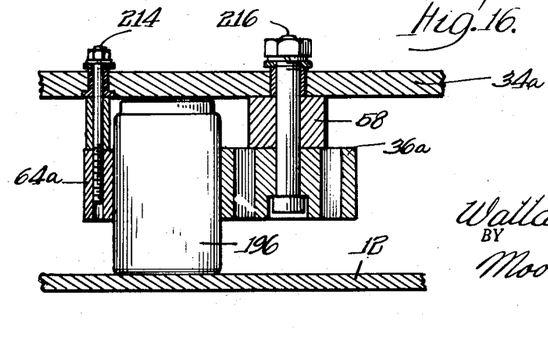
Fig. 16 is a further enlarged detail section of the mechanism of Figs. 14 and 15, taken as indicated by the line 16—16 of Fig. 15.

In Figs. 14–16 an embodiment is illustrated substantially similar to that previously described, except that the transfer fingers experience a pivotal as well as lateral motion. Referring to Fig. 14, it will be seen that there is provided, in addition to the reciprocating finger support bar 34a, corresponding in general function and purpose to the bar 34 in the embodiment previously described, a fixed bar or finger support member as indicated at 200. This latter support bar extends longitudinally of the conveyor belt 14, and is held in spaced relation thereabove by means of a pair of support brackets 202 and 204 suitably carried by the frame of the machine.

As best shown in Figs. 15 and 16, the several transfer fingers as indicated at 36a, 62a, 64a and 66a are each pivotally supported at one end upon the fixed support bar 200 and suitably connected at their opposite ends by bolt and slot connections to the reciprocating bar 34a. Thus referring for example to the support connections for the finger 64a and its juxtaposed finger 36a, it will be seen that these transfer fingers are connected, respectively, to the bar 200 by pivot bolts 206 and 208; the fingers being provided at their opposite ends with bolts as indicated at 210 and 212 engageable within slots 214 and 216 formed in the bar 34a.

By reason of the described connections, as the bar 34a is reciprocated, it will be seen that the several transfer fingers will be laterally shifted at their ends against which the jars are initially engaged, such lateral motion, however, being pivotal as well as lateral due to the pivot connections with the fixed support bar 200. In certain types of jars, or other articles, a combined lateral and pivotal motion of the transfer fingers, as set forth in the structure of Figs. 14–16, is desirable.

Figure 17:
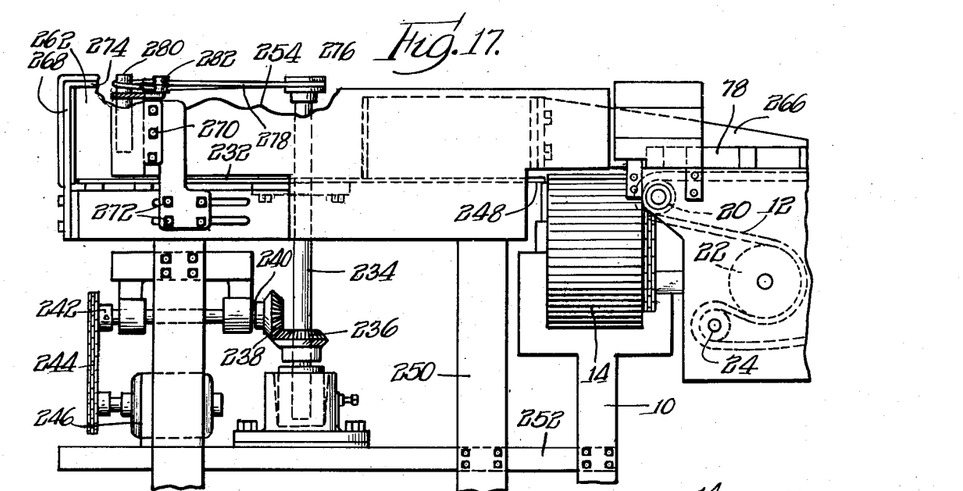
Fig. 17 is a side elevation of the machine of Figs. 1-16, including a transfer mechanism particularly adapted for use in the handling of cans.
Figure 18:
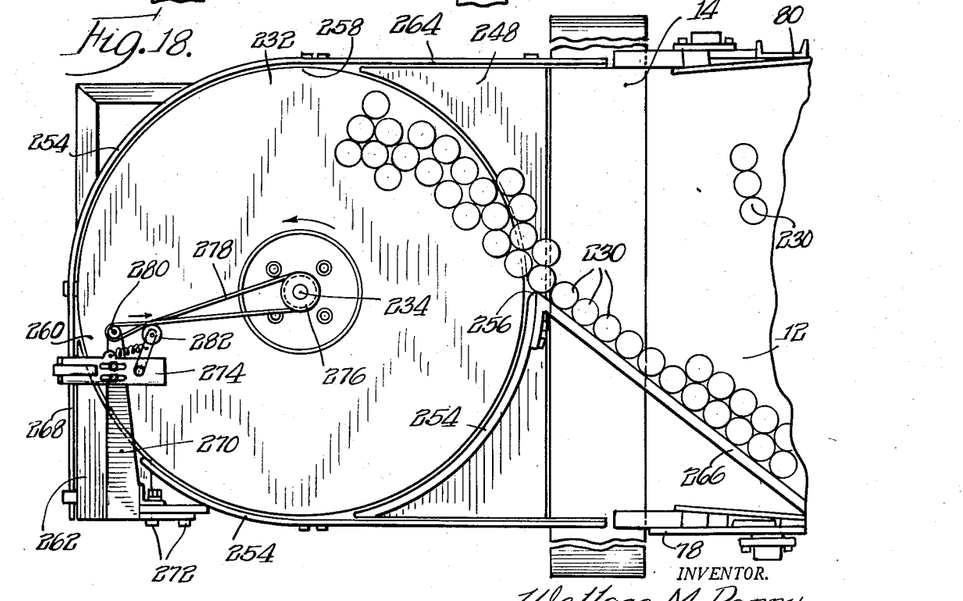
Fig. 18 is a plan view of the structures shown in Fig. 17.

In Figs. 17 and 18 a structure is illustrated incorporating means specifically adapted for the handling of articles such as container cans. In general, cans may with safety be subjected to a greater shock than glass jars, and in certain instances greater capacity operations may be obtained, with cans, by the structures shown in Figs. 17 and 18.

In this instance, the conveyor belt 14 is maintained stationary, as by removal of one of the pickoff drive gears 134—138; the finger support bar 34 and the fingers carried thereby are removed from the machine along with the guide bar 86 and its support 88; and a can transfer mechanism, as shown in Figs. 17 and 18, applied to the end of the machine in abutting relation to the conveyor belt 14. Upon operation of the belt 12, as previously described, with the belt 14 stationary, the cans, such as indicated at 230, Fig. 18, will be fed by the conveyor 12 across the conveyor 14 as a table surface and to the can transfer mechanism now to be described.

Referring to Figs. 17 and 18, the can transfer mechanism comprises a rotatable table 232 carried at the upper end of a drive shaft 234, the lower end of which carries a beveled drive gear 236. This gear meshes with and is driven by a gear 238 carried by a stub shaft 240, the end of which carries a chain sprocket 242. Sprocket 242 is arranged to be driven by a chain 244 operated from an electric motor or other suitable power source 246.

Coplanar with the rotatable table 232 there is provided a table surface 248 across which the cans are propelled in their movement from the conveyor 12 to the rotating table structure. The table surface 248 is arranged so that it substantially abuts and lies slightly below the belt 14 when the can transfer mechanism is assembled into operative position.

To effect the accurate positioning of the table surface 248 in respect to the belt 14, it will be seen that the can transfer mechanism is mounted upon a frame structure 250, said frame structure being provided with an extension arm 252 arranged for direct attachment to the frame structure 10 by means of suitable securing bolts or the like.

To maintain the cans properly upon the rotatable table, there is provided a wall structure 254 which extends circumferentially of the table except for the 90° quadrant between the points designated by the numerals 256 and 258, defining the inlet for the cans onto the table; and except for the point designated by the reference numeral 260 where the cans are ejected from the table into an outlet slide or chute 262. To maintain the cans properly upon the approach table 248, this table is provided with a side wall structure 264, aligned with the side wall structure 80 previously described. There is further provided an angularly disposed guide plate 266, suitably secured to the wall structure 254, this guide plate having its end juxtaposed to and abutting the opposite wall structure 78 of the table 10.

As will be understood, the guide plate 266 is spaced slightly above the belt 12, so as not to interfere with the operation thereof.

The outlet chute or channel 262 is defined by a side wall structure 268 and by an arm 270 adjustably mounted on the machine frame at one end by bolts 272, and adjustably secured at its other end to a frame bracket 274 which extends over the edge of the table and is spaced above the surface thereof. By adjustment of the arm 270, to the right or left, as seen in Fig. 18, the size of the outlet chute 262 may be adjusted so as to control the pattern of the cans at the machine output.

The upper end of the table drive shaft 234 carries a pulley 276 arranged to operate a crossed rope 278 which engages and drives a roller 280 rotatably mounted in a journal bracket at the end of the arm 270. Roller 280 is vertically elongated so that the lower end thereof is slightly spaced from the table surface. A tension roll 282 engages the rope for maintaining it taut.

It will be seen that in the operation of the structure the presence of the cans, propelled by the belt 12, causes the cans to move across the belt 14 and the juxtaposed table surface 248 onto the rotatable table 232. Rotation of the table moves the cans onto the outer table surface, by centrifugal force, and the pressure of oncoming cans causes the ejection of the cans at the outer margin of the table through the ejector chute 262 in the desired single file pattern to a receiving conveyor or other receiving device. The pattern of the ejected cans may be controlled by adjustment of the arm 270, as previously described. The roller 280 operates to prevent jamming of the cans at the ejector station.

Figures 19, 20, 21:
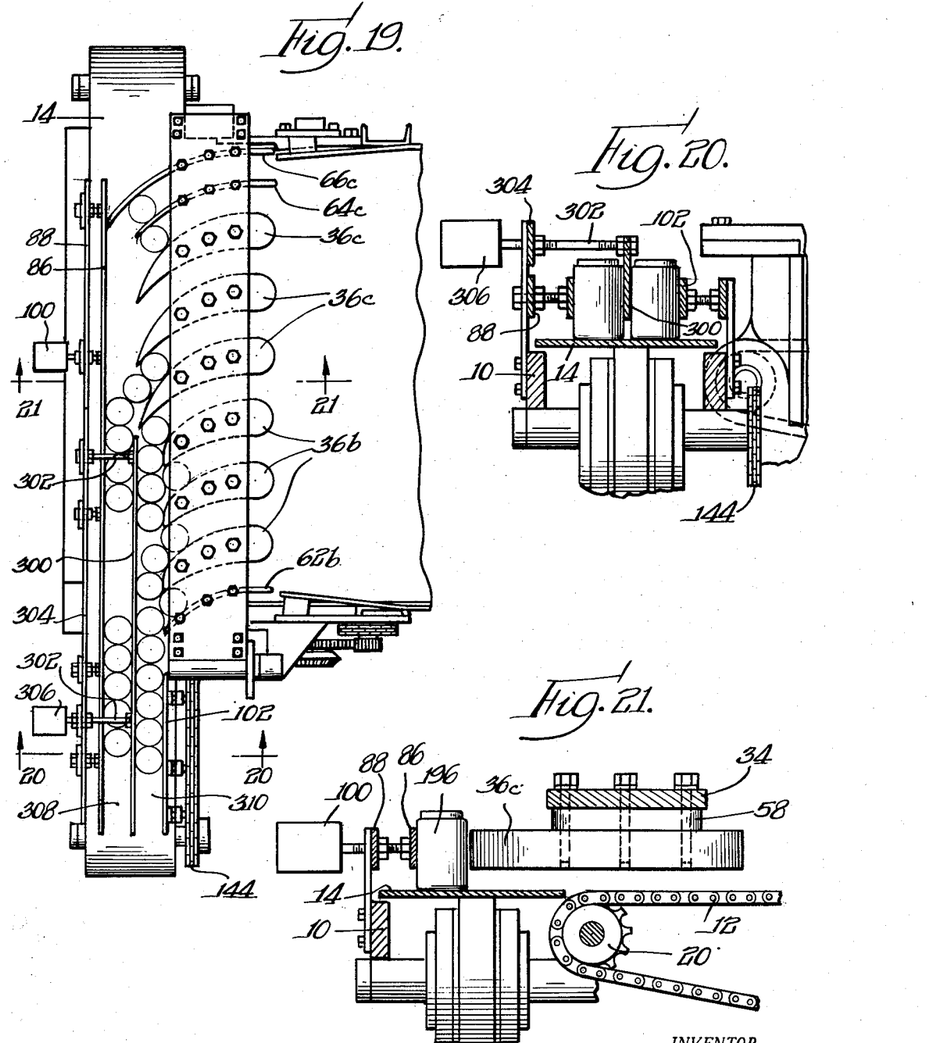
Fig. 19 is a partial plan view of a further modified form of machine structure, in accordance with the invention.
Figs. 20 and 21 are enlarged sectional views on the lines 20—20 and 21—21, respectively, of Fig. 19.

Referring to Figs. 19-21, a structural arrangement is illustrated which may in certain instances be preferred for securing a multiple pattern output for the articles handled. It will be seen that the structure is essentially the same as that set forth in Figs. 1-13 except that certain of the transfer fingers, as indicated at 36b and 62b are shorter than the remaining transfer fingers as indicated at 36c, 64c and 66c; and two guide rails cooperable respectively with the different groups of transfer fingers are provided.

More particularly, in addition to the guide rail 86, previously described, which is cooperable with the fingers 36c, 64c and 66c; there is provided an additional guide rail 300 supported by bolts, as indicated at 302. These bolts extend from and are supported by a plate or rail 304 positioned above the support rail 88 and supported by the same frame brackets. The bolts 302 provide resilient support for the guide rail 300 in the same manner as the bolts 90 previously described, and one of the bolts 302 has an electromagnetic vibrator 306 associated therewith operable in a manner similar to the previously described vibrator 100. It will be seen that the support bolts 302 are vertically positioned so that they do not interfere with the progress of the jars guided along the passage 308 between the guide plates 86 and 300.

The jars ejected from between the transfer fingers 36b and 62b pass along the passage 310 between the guide plate 300 and the guide plate 102, previously described.

It is believed that the operation of the structure of Figs. 19-21, in view of the foregoing, will be clear. The arrangement shown provides a definite multiple row pattern for the jars as they are ejected from the discharge conveyor, under guided control at all times.

It is obvious that various changes may be made in the specific embodiments set forth and described without departing from the spirit of the invention. The invention is accordingly not to be limited to the specific embodiments shown and described, but only as indicated in the following claims.

The invention is hereby claimed as follows:

1. An article handling machine comprising an infeed conveyor, a discharge conveyor operable in a direction transversely of the infeed conveyor, and transfer mechanism for transferring articles between the conveyors comprising a group of transfer members disposed to form a plurality of parallel transfer passages between the conveyors, said transfer members being spaced to provide a single file track for the articles therebetween and being inclined from the infeed to the discharge conveyor in the direction of movement of the discharge conveyor with the discharge ends of the group of transfer members positioned with respect to the discharge conveyor to position the articles for unimpeded single line passage on the discharge conveyor, and means for shifting said members during operation of the machine to facilitate the passage of the articles through said passages.

2. An article handling machine as defined in claim 1, wherein said transfer members are shiftable transversely of the infeed conveyor.

3. An article handling machine comprising an infeed conveyor operable along a predetermined axis, a discharge conveyor operable upon an axis disposed substantially perpendicularly to the axis of the infeed conveyor, and transfer mechanism for transferring articles between the conveyors comprising a group of transfer members disposed to form a plurality of parallel transfer passageways between the conveyors, said transfer members being spaced to provide a single file track for the articles therebetween and being inclined from the infeed to the discharge conveyor in the direction of movement of the discharge conveyor with the discharge ends of the group of transfer members positioned with respect to the discharge conveyor to position the articles for unimpeded single line passage on the discharge conveyor, and means for shifting said members transversely of the infeed conveyor during operation of the machine to facilitate the passage of the articles through said passages.

4. An article handling machine comprising an endless belt infeed conveyor, an endless belt discharge conveyor angularly disposed in respect to the infeed conveyor, and transfer mechanism for transferring articles between the conveyors comprising a plurality of transfer members disposed to form a plurality of parallel transfer passages between the conveyors, said members being curved from the infeed conveyor toward the direction of movement of the discharge conveyor and providing said transfer passages of equal width having their discharge ends in alignment substantially axially of the discharge conveyor, and means for shifting said members during operation of the machine to facilitate the passage of the articles through said passages.

5. An article handling machine comprising an infeed conveyor, a discharge conveyor operable in a direction transversely of the infeed conveyor, means for operating said conveyors, and transfer mechanism for transferring articles between the conveyors comprising a group of transfer members disposed to form a plurality of transfer passages between the conveyors, said transfer members being spaced to provide a single file track for the articles therebetween and being inclined from the infeed to the discharge conveyor in the direction of movement of the discharge conveyor with the discharge ends of the group of transfer members positioned with respect to the discharge conveyor to position the articles for unimpeded single line passage on the discharge conveyor, means for shifting said members during operation of the machine to facilitate the passage of the articles through said passages, and means for varying the speed of operation of the shifting means in respect to the speed of movement of the conveyors and for varying the speed of operation of the conveyors in respect to each other.

6. An article handling machine comprising an infeed conveyor, a discharge conveyor angularly disposed in respect to the infeed conveyor, means for operating said conveyors, and transfer mechanism for transferring articles between the conveyors comprising a plurality of transfer members disposed to form a plurality of transfer passages between the conveyors, each of said members being of decreasing width and having an abutment surface overlying the infeed conveyor and a curved guiding surface overlying both conveyors and extending from the abutment surface in the direction of travel of the discharge conveyor.

7. An article handling machine comprising an infeed conveyor, a discharge conveyor angularly disposed in respect thereto, means for operating said conveyors, and transfer mechanism for transferring articles between the conveyors comprising a transfer member disposed to form a plurality of transfer passages between the conveyors, said transfer member having an abutment surface overlying the infeed conveyor and a pair of continuous curved guiding surfaces extending between the conveyors in the direction of movement of the discharge conveyor and converging to a point overlying the discharge conveyor surface.

8. An article handling machine comprising an infeed conveyor, a discharge conveyor, and transfer mechanism for transferring articles between the conveyors comprising a plurality of transfer members disposed to form a plurality of parallel transfer passages between the conveyors, said members having juxtaposed curved guiding surfaces defining the side walls of said passages, the juxtaposed curved surfaces of adjacent transfer members being substantially arcuate and having substantially the same center of curvature, and the opposed curved surfaces of each transfer member converging to a point overlying the discharge conveyor surface.

9. An article handling machine as defined in claim 1, wherein said transfer members are shifted as a unit transversely of the infeed conveyor.

10. An article handling machine as defined in claim 1, wherein said transfer members are pivotally mounted, and are pivoted in unison by said shifting means.

11. An article handling machine comprising an infeed conveyor, a discharge conveyor operable in a direction transversely of the infeed conveyor, and transfer mechanism for transferring articles between the conveyors comprising a plurality of groups of transfer members overlying said conveyors and disposed to form a plurality of parallel transfer passages therebetween, said transfer members being spaced to provide a single file track for the articles therebetween and being inclined from the infeed to the discharge conveyor in the direction of movement of the discharge conveyor with the discharge ends of each group of transfer members positioned with respect to the discharge conveyor to position the articles from each group for unimpeded single line passage on the discharge conveyor, the terminal points of one group of said transfer members overlying the discharge conveyor being displaced in respect to the terminal points of another group of said transfer members whereby the articles are formed onto the discharge conveyor into a plurality of parallel lines.

12. An article handling machine comprising an endless belt infeed conveyor, an endless belt discharge conveyor disposed substantially perpendicularly to the infeed conveyor and having one edge thereof substantially coincident with the terminal end of the infeed conveyor, the upper surfaces of said conveyors being substantially coplanar, means for operating the conveyors, and a transfer mechanism for transferring articles between the conveyors comprising a plurality of transfer members suspended above the conveyors and overlying the plane of operation thereof, each of said transfer members having an abutment surface overlying the infeed conveyor, and a pair of curved guiding surfaces converging toward each other and extending from the abutment surface in the direction of travel of the discharge conveyor, said transfer members defining a plurality of parallel transfer passages of substantially equal width extending between the conveyors.

13. An article handling machine as claimed in claim 1, wherein the discharge ends of the transfer members are disposed in alignment substantially axially of the discharge conveyor, and a stop rail is positioned along the discharge conveyor opposite the discharge ends of said transfer members and spaced therefrom substantially the width of the articles issuing therefrom.

14. An article handling machine comprising an endless belt infeed conveyor, an endless belt discharge conveyor disposed substantially perpendicularly to the infeed conveyor and positioned at the discharge end thereof, a plurality of fixed abutment devices disposed in spaced relation and overhanging the infeed conveyor, and a transfer mechanism for transferring articles between the conveyors, said transfer mechanism comprising a plurality of transfer members disposed in spaced relation and overhanging the conveyors to form a plurality of parallel transfer passages therebetween, means for shifting said transfer members during operation of the machine, a guide rail extending along the discharge conveyor for receiving the articles from the transfer members, and means for vibrating the guide rail.

WALLACE M. PARRY.

References Cited in the file of this patent

UNITED STATES PATENTS

| Number | Name | Date |
|---|---|---|
| 646,469 | Sleeper | Apr. 3, 1900 |
| 744,874 | Neeland | Nov. 24, 1903 |
| 1,079,165 | Conte | Nov. 18, 1913 |
| 1,280,950 | Bernheim | Oct. 8, 1918 |
| 1,685,335 | Paterson | Sept. 25, 1928 |
| 1,755,720 | Winkler | Apr. 22, 1930 |
| 2,351,801 | Baumann | June 20, 1944 |